(12) United States Patent
Tian et al.

(10) Patent No.: US 12,340,964 B2
(45) Date of Patent: Jun. 24, 2025

(54) CONTACT APPARATUS, ELECTROMAGNETIC SWITCH, ONBOARD CHARGER, AND NEW ENERGY VEHICLE

(71) Applicant: Huawei Digital Power Technologies Co., Ltd., Shenzhen (CN)

(72) Inventors: Xiaokang Tian, Shenzhen (CN); Taixian Chen, Dongguan (CN); Fugao Zhao, Dongguan (CN); Yuhan He, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 116 days.

(21) Appl. No.: 18/155,885

(22) Filed: Jan. 18, 2023

(65) Prior Publication Data
US 2023/0178320 A1    Jun. 8, 2023

Related U.S. Application Data

(63) Continuation of application No. PCT/CN2020/106111, filed on Jul. 31, 2020.

(51) Int. Cl.
  *H01H 50/58* (2006.01)
  *B60L 53/10* (2019.01)
  *H01H 50/18* (2006.01)

(52) U.S. Cl.
  CPC ............ *H01H 50/58* (2013.01); *B60L 53/10* (2019.02); *H01H 50/18* (2013.01)

(58) Field of Classification Search
  CPC ........................................ H01H 50/58

USPC ......................................... 335/126, 131, 132
See application file for complete search history.

(56) References Cited

U.S. PATENT DOCUMENTS

| | | | | |
|---|---|---|---|---|
| 2,378,162 A * | 6/1945 | Stapleton | ............... | H01H 50/30 335/131 |
| 2,481,431 A * | 9/1949 | Logan | .................... | H01H 50/30 361/194 |
| 3,242,285 A * | 3/1966 | Obszarny | ............... | H01H 50/58 335/202 |
| 4,528,535 A * | 7/1985 | Lemmer | ................. | H01H 50/34 335/132 |
| 4,931,757 A * | 6/1990 | Lemmer | ................. | H01H 89/06 335/8 |

(Continued)

FOREIGN PATENT DOCUMENTS

| | | |
|---|---|---|
| CN | 204270912 U | 4/2015 |
| CN | 108417448 A | 8/2018 |

(Continued)

*Primary Examiner* — Alexander Talpalatski
(74) *Attorney, Agent, or Firm* — Maier & Maier, PLLC

(57) ABSTRACT

A contact apparatus includes a base body, two fixed contacts, and a moving contact component. The base body has an inner cavity. The two fixed contacts are fastened to the base body at intervals and extend into the inner cavity of the base body. The moving contact component includes a pushing member and a moving contact. The pushing member is movably disposed through the base body. The moving contact is mounted on the pushing member and is located in the inner cavity of the base body. The pushing member is configured to drive the moving contact to move, so that the moving contact is in contact with or is separated from the two fixed contacts.

17 Claims, 11 Drawing Sheets

(56) References Cited

U.S. PATENT DOCUMENTS

| | | | | |
|---|---|---|---|---|
| 5,680,084 | A * | 10/1997 | Kishi | H01H 1/66 |
| | | | | 335/154 |
| 7,023,306 | B2 * | 4/2006 | Nishida | H01H 50/305 |
| | | | | 335/128 |
| 7,095,303 | B2 * | 8/2006 | Ohkubo | H01H 50/34 |
| | | | | 335/132 |
| 7,760,055 | B2 * | 7/2010 | Adunka | H01H 1/0015 |
| | | | | 335/8 |
| 7,911,304 | B2 * | 3/2011 | Yano | H01H 50/38 |
| | | | | 335/229 |
| 8,558,648 | B2 * | 10/2013 | Choi | H01H 51/065 |
| | | | | 335/126 |
| 12,094,673 | B2 * | 9/2024 | Hoffmann | H01H 50/18 |
| 2019/0385804 | A1 | 12/2019 | Burkman | |

FOREIGN PATENT DOCUMENTS

| | | |
|---|---|---|
| CN | 208985930 U | 6/2019 |
| CN | 209000835 U | 6/2019 |
| CN | 209199848 U | 8/2019 |
| CN | 209388949 U | 9/2019 |
| CN | 111409503 A | 7/2020 |
| DE | 1148304 B | 5/1963 |
| EP | 3591684 A1 | 1/2020 |
| WO | 2017059821 A1 | 4/2017 |
| WO | 2022188984 A1 | 9/2022 |

* cited by examiner

CONTACT APPARATUS, ELECTROMAGNETIC SWITCH, ONBOARD CHARGER, AND NEW ENERGY VEHICLE

CROSS-REFERENCE TO RELATED APPLICATIONS

This application is a continuation of International Application No. PCT/CN2020/106111, filed on Jul. 31, 2020, the disclosure of which is hereby incorporated by reference in its entirety.

TECHNICAL FIELD

The embodiments relate to the field of electrical control device technologies, contact apparatus, an electromagnetic switch having the contact apparatus, an onboard charger, and a new energy vehicle.

BACKGROUND

An electromagnetic switch is an electric appliance that can frequently make, carry, and break a normal current and a specified overload current. An operating principle of the electromagnetic switch is that a current flows through a coil to generate an electromagnetic field, so that a contact is closed or opened, thereby controlling load. The electromagnetic switch generally includes a contactor and a relay.

When a moving contact in the electromagnetic switch is in contact with fixed contacts, the moving contact is subject to electric repulsion produced by a current. A part of the electric repulsion is the Holm force produced through contraction when the current flows through a contact point between the moving contact and the fixed contacts, and a higher current leads to a larger Holm force. In this case, when the electric repulsion applied to the moving contact is greater than contact pressure applied to the moving contact, the moving contact has a risk of being electrically repulsed.

In the field of new energy vehicles and the like, a short-circuit current of a system is continuously increased. This means that a requirement on a capability of an electromagnetic switch to resist a short-circuit current is increasingly high, to reduce a risk that the moving contact is electrically repulsed. For an existing electromagnetic switch, a capability of the electromagnetic switch to resist a short-circuit current is improved by increasing contact pressure in an electric force compensation apparatus, but such a structure is not enough to resist electric repulsion produced by a high (for example, more than 10 kA) short-circuit current. This easily causes a moving contact to be electrically repulsed and even causes an explosion or fire, resulting in safety accidents.

SUMMARY

The embodiments include a contact apparatus that can improve a capability to resist a short-circuit current, an electromagnetic switch, an onboard charger, and a new energy vehicle.

According to a first aspect, the embodiments may provide a contact apparatus that is used in an electromagnetic switch, including a base body, two fixed contacts, and a moving contact component. The base body has an inner cavity. The two fixed contacts are fastened to the base body at intervals and extend into the inner cavity of the base body. The moving contact component includes a pushing member and a moving contact. The pushing member is movably disposed through the base body. The moving contact is mounted on the pushing member and is located in the inner cavity of the base body. The moving contact includes N parallel contact pieces, where N is an integer greater than 1. The N parallel contact pieces are capable of being in contact with or being separated from the two fixed contacts under driving of the pushing member.

When the moving contact and the fixed contacts are closed to conduct a current, the moving contact is subject to electric repulsion produced by the current. A part of the electric repulsion is the Holm force $F_h$, and $F_h = \mu_0/4\pi I^2 \ln R/r$. $\mu_0$ is magnetic permeability in a vacuum, R is a radius of the moving contact, and r is a radius of a region in which the moving contact is in contact with the fixed contacts (namely, a contact radius). As the current I increases, the Holm force $F_h$ increases.

The contact apparatus may use a bridge-type double-breakpoint contact structure, the moving contact includes the N parallel contact pieces, a current flowing through each contact piece 521 is 1/N of a total current I of the moving contact 52, and Holm force $F_h'$ applied to each contact piece is $1/N^2 F_h$. This greatly reduces the Holm force applied to the moving contact, reduces a possibility that the moving contact is electrically repulsed when the moving contact is subject to a high short-circuit current, improves a short-circuit tolerance capability of the contact apparatus and the electromagnetic switch, and improves safety and reliability of the contact apparatus and the electromagnetic switch.

For an electric force compensation apparatus in a conventional technology, when a short-circuit current is high, a saturation phenomenon occurs in a magnet, and consequently electromagnetic suction force no longer increases with an increase in the short-circuit current. This affects the short-circuit tolerance capability of the contact apparatus. In contrast, the moving contact may include the N parallel contact pieces, so that the Holm force applied to the moving contact is reduced. This improves a capability of the contact apparatus to resist a short-circuit current and also facilitates miniaturization of the contact apparatus.

According to the first aspect, in a first possible implementation of the first aspect, the moving contact component further includes a connection member and a contact elastic member. The N parallel contact pieces are all provided with a first sliding hole. The connection member is slidably disposed through the first sliding hole and is fixedly connected to the pushing member. The contact elastic member is located between the N parallel contact pieces and the pushing member. The N parallel contact pieces are capable of moving towards or away from the fixed contacts relative to the pushing member.

The contact elastic member is located between the N parallel contact pieces and the pushing member, and is configured to provide elastic force for the contact pieces. The contact elastic member ensures contact pressure when the contact pieces are in contact with the fixed contacts, so that the contact pieces and the fixed contacts keep in desirable contact with each other. In addition, the contact elastic member alleviates impact force between the moving contact and the fixed contacts to some extent when the moving contact and the fixed contacts are in contact with each other, to reduce a possibility that the moving contact and the fixed contacts are damaged, thereby prolonging a service life of the electromagnetic switch.

According to the first possible implementation of the first aspect, in a second possible implementation of the first aspect, the pushing member includes a push rod, an isolation member, and a contact bracket. The isolation member is fixedly sleeved at one end of the push rod. The contact bracket is fixedly sleeved outside the isolation member. The N parallel contact pieces are disposed through the contact bracket. The connection member is fixedly connected to the contact bracket. The elastic member abuts between the isolation member and the N parallel contact pieces. The isolation member is configured to keep electrical insulation between the push rod and the N parallel contact pieces.

When the moving contact and the fixed contacts are connected to each other after being in contact, the moving contact and the fixed contacts form a contact high-voltage circuit, and the isolation member can effectively isolate the contact high-voltage circuit from other low-voltage parts of the electromagnetic switch. In this way, when the electromagnetic switch having the contact apparatus carries a high current or direct current high-voltage load, the low-voltage parts of the electromagnetic switch are not damaged because of impact of the high current and the high voltage, and a safety problem caused by a breakdown between a high voltage and a low voltage is prevented, that is, safety and reliability of the contact apparatus are improved.

According to the second possible implementation of the first aspect, in a third possible implementation of the first aspect, the moving contact component further includes a compensation structure. The compensation structure includes a movable magnetizer and a static magnetizer. The movable magnetizer is movably connected to the contact bracket. The static magnetizer is fastened to the contact bracket and is located on one side that is of the contact pieces and that faces away from the push rod. An operating air gap is formed between the static magnetizer and the movable magnetizer. Electromagnetic suction force is capable of being produced between the movable magnetizer and the static magnetizer based on the current flowing through the moving contact and the fixed contacts when the moving contact and the fixed contacts are in contact with each other, so that the movable magnetizer moves towards the static magnetizer.

When the current is conducted between the moving contact and the fixed contacts, the electromagnetic suction force is produced between the static magnetizer and the movable magnetizer. Magnitude of the electromagnetic suction force is directly proportional to a square of the current and an air gap area of the operating air gap, and is inversely proportional to a square of an air gap distance of the operating air gap. When the movable magnetizer moves towards the static magnetizer, the air gap distance of the operating air gap becomes smaller, and then the electromagnetic suction force becomes larger. This offsets a part of the Holm force applied to the moving contact. A moving contact structure including the N parallel contact pieces together with the compensation structure greatly improves the short-circuit tolerance capability of the contact apparatus and the electromagnetic switch.

According to the third possible implementation of the first aspect, in a fourth possible implementation of the first aspect, the movable magnetizer is accommodated in the contact bracket, the contact bracket includes a bottom wall portion of the movable magnetizer and a side wall portion formed by bending and extending from two ends of the bottom wall portion. An opening groove is enclosed jointly by the bottom wall portion and the side wall portion. The N parallel contact pieces are disposed through the opening groove. The bottom wall portion is located between the contact pieces and the isolation member. The side wall portion is provided with a second sliding hole. The contact elastic member is disposed through the bottom wall portion. The connection member is slidably disposed through the second sliding hole. The movable magnetizer is capable of moving relative to the contact pieces. The movable magnetizer wraps the N parallel contact pieces, and this facilitates assembly of the movable magnetizer and the N parallel contact pieces. Because the movable magnetizer is capable of moving relative to the moving contact, the air gap distance that can be reduced for the operating air gap is greater than contact over-travel. This is conducive to further reducing the air gap distance of the operating air gap, thereby further improving the capability of the contact apparatus to resist a short-circuit current.

According to the fourth possible implementation of the first aspect, in a fifth possible implementation of the first aspect, the compensation structure further includes an elastic piece, and the elastic piece abuts between the bottom wall portion of the movable magnetizer and the N contact pieces, to help the movable magnetizer to be reset.

According to the third possible implementation of the first aspect, in a sixth possible implementation of the first aspect, the compensation structure further includes a mounting bracket, the mounting bracket is fastened to the contact bracket, the static magnetizer is fastened to the mounting bracket, and the static magnetizer is located between the mounting bracket and the N parallel contact pieces. The static magnetizer is fastened to the contact bracket by using the mounting bracket, and this facilitates assembly and disassembly of the static magnetizer.

According to any one of the second to the sixth possible implementations of the first aspect, in a seventh possible implementation of the first aspect, the contact pieces are provided with limiting sub-grooves, the limiting sub-grooves on the N parallel contact pieces are connected to each other to form a limiting groove, and the contact elastic member abuts between isolation member and an inner wall of the limiting groove. In this way, the same contact elastic member can abut against all the contact pieces, and the same contact elastic member provides the elastic force for all the contact pieces, to ensure the contact pressure between all the contact pieces and the fixed contacts, reduce a quantity of contact elastic members to be used, and simplify structures of the moving contact component and the contact apparatus. This facilitates assembly and disassembly.

According to any one of the second to the sixth possible implementations of the first aspect, in an eighth possible implementation of the first aspect, the isolation member includes a connecting portion and a guiding portion. The connecting portion is fixedly sleeved at one end of the push rod and is fixedly disposed through the contact bracket. The guiding portion is disposed in a protruding manner on one side that is of the connecting portion and that faces away from the push rod. The contact elastic member is sleeved on the guiding portion. The guiding portion is configured to guide movement of the contact elastic member relative to the contact bracket, to improve contact stability between all the contact pieces and the fixed contacts.

According to any one of the first aspect or the first to the eighth possible implementations the first aspect, in a ninth possible implementation of the first aspect, the connection member includes a contact shaft and two clamping pieces. A clamping groove is provided at each end of the contact shaft. The contact shaft is disposed through the first sliding hole and the contact bracket. The clamping groove is located outside the contact bracket. Each clamping piece is clamped into a corresponding clamping groove, and the contact shaft is fastened to the contact bracket in a clamping manner. This facilitates assembly and disassembly of the moving contact component.

According to a second aspect, the embodiments may further provide an electromagnetic switch, including a driving apparatus and the contact apparatus that is described above. One end that is of the base body and that is away from the fixed contacts is fixedly connected to the driving apparatus. The driving apparatus is connected to one end that is of the pushing member of the contact apparatus and that is away from the moving contact, and is configured to drive the pushing member to move.

The contact apparatus in the electromagnetic switch provided in the second aspect uses a bridge-type double-breakpoint contact structure, and the moving contact includes the N parallel contact pieces. This greatly reduces Holm force applied to each contact piece, reduces a possibility that the moving contact is electrically repulsed when the moving contact is subject to a high short-circuit current, improves a short-circuit tolerance capability of the contact apparatus and the electromagnetic switch, and improves safety and reliability of the contact apparatus and the electromagnetic switch.

According to a third aspect, the embodiments may further provide an onboard charger, including the electromagnetic switch described above.

According to a fourth aspect, the embodiments may further provide a new energy vehicle, including the onboard charger described above and a battery pack. The battery pack is configured to store a quantity of electricity input by the onboard charger and is further configured to perform inversion discharge by using the onboard charger.

DETAILED DESCRIPTION OF THE EMBODIMENTS

To make objectives, solutions, and advantages clearer, the following further describes the embodiments in detail with reference to the accompanying drawings.

It should be understood that terms such as "including" and "may include" may indicate existence of a disclosed function, operation, or constituent element, and do not limit one or more additional functions, operations, and constituent elements. Terms such as "including" and/or "having" may be interpreted to indicate a particular characteristic, quantity, operation, constituent element, component, or combination thereof, but it should not be interpreted as excluding existence or an addition possibility of one or more other characteristics, quantities, operations, constituent elements, components, or combinations thereof.

In addition, a term "and/or" includes all combinations of associated terms listed. For example, a term "A and/or B" may include A, may include B, or may include both A and B.

Terms including ordinal numbers such as "first" and "second" can modify various elements. However, the foregoing terms do not limit these elements. For example, the foregoing terms do not limit a sequence and/or importance of the elements. The foregoing terms are used only to distinguish one element from the others. For example, first user equipment and second user equipment indicate different user equipment, although both the first user equipment and the second user equipment are user equipment. Similarly, a first element may be referred to as a second element and the second element may also be referred to as the first element.

When a component is "connected to" or "accesses" other components, it should be understood that the component is directly connected to or directly accesses the other components, and that another component may exist between the component and the other components. Moreover, when a component is "directly connected to" or "directly accesses" other components, it should be understood that no component exists between the component and the other components.

Figure 1:
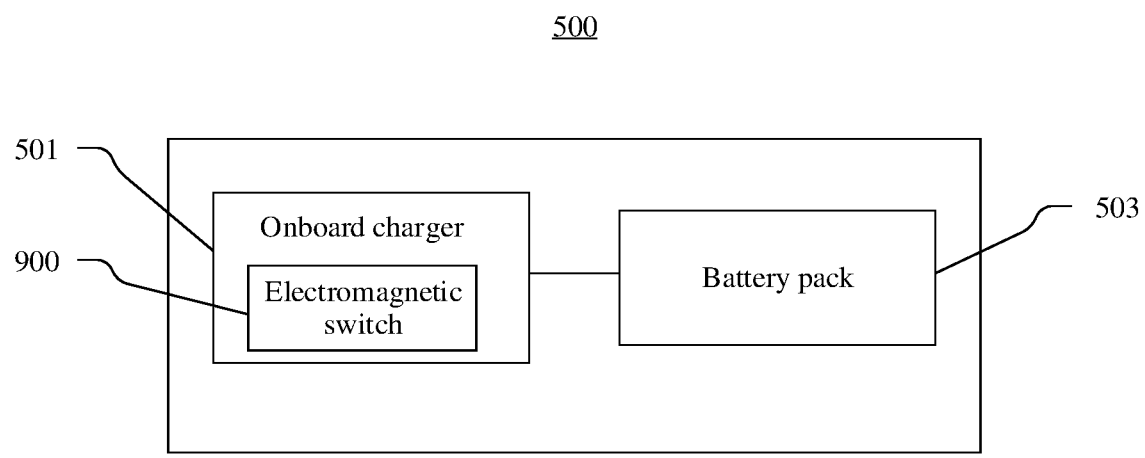
FIG. 1 is a block diagram of a structure of a new energy vehicle.

As shown in FIG. 1, the embodiments may provide an electromagnetic switch 900 that is applied to a new energy vehicle 500. The new energy vehicle 500 includes an onboard charger 501 and a battery pack 503. The battery pack 503 is configured to store a quantity of electricity input by the onboard charger 501, and is further configured to perform inversion discharge by using the onboard charger 501. The onboard charger 501 includes the electromagnetic switch 900, configured to control on/off of a current, isolate a high voltage of a power supply, and the like, to ensure normal operation of load or prevent an electric shock risk. It can be understood that the new energy vehicle 500 may further include other necessary or unnecessary structures or modules, for example, a drive system, a braking system, or a battery management system, and details are not described herein. The onboard charger 501 may further include other necessary or unnecessary structures or modules, for example, an interface, and details are not described herein.

The following further describes the electromagnetic switch in the embodiments.

Figure 2:
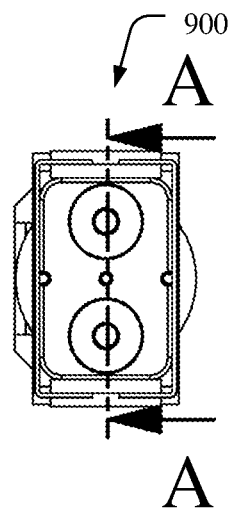
FIG. 2 is a top view of an electromagnetic switch according to a first implementation.

FIG. 2 is a top view of an electromagnetic switch according to a first implementation. The electromagnetic switch 900 in this embodiment may be an electric appliance that can frequently make, carry, and break a normal current and a specified overload current. An operating principle of the electromagnetic switch 900 is that a current flows through a coil to generate an electromagnetic field, so that a contact is closed or opened, thereby controlling load. The electromagnetic switch 900 generally includes an electromagnetic relay and a contactor. A direct current contactor is used as an example for description in this embodiment.

Figure 3:
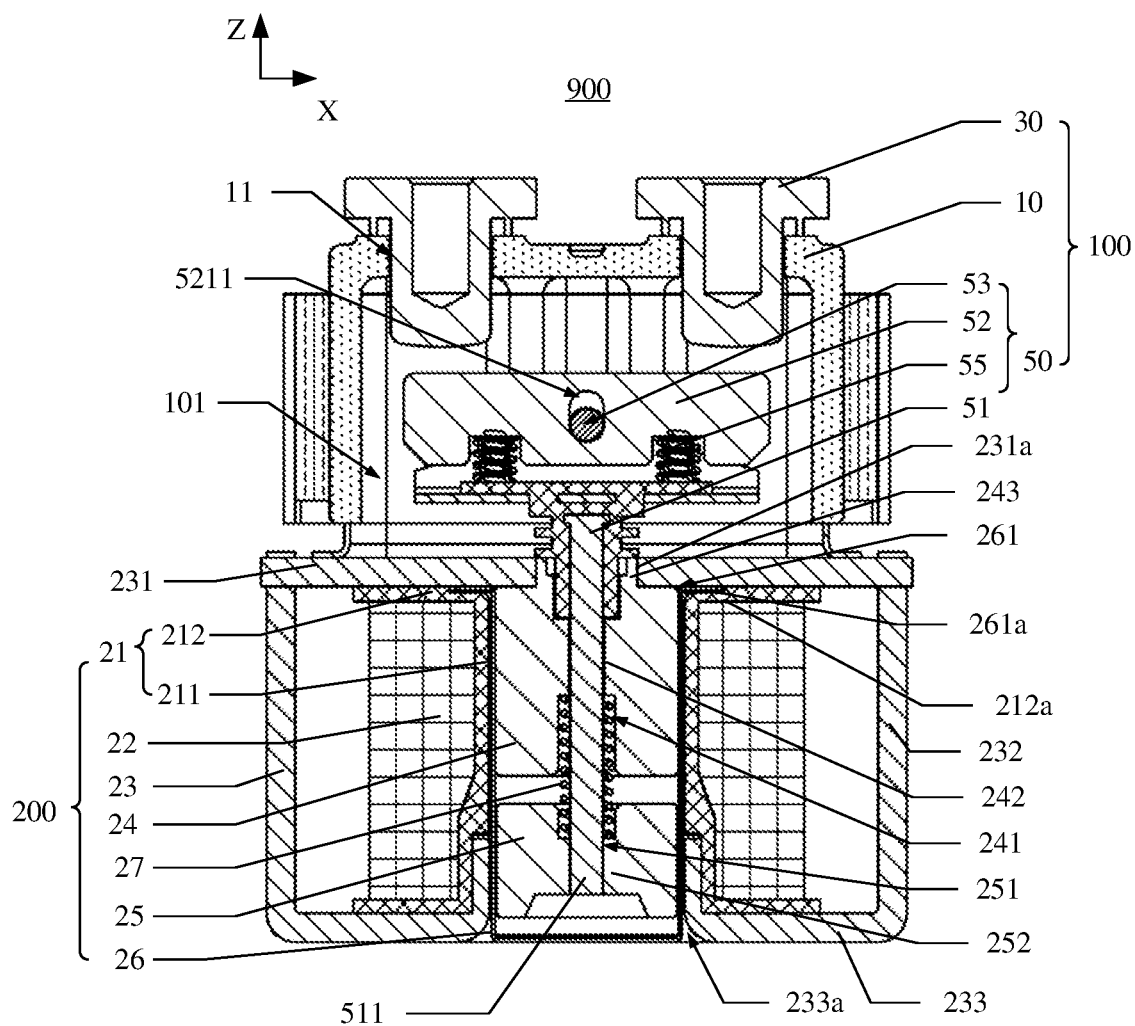
FIG. 3 is a cross-sectional view of the electromagnetic switch shown in FIG. 2 along an A-A line.

FIG. 3 is a cross-sectional view of the electromagnetic switch in FIG. 2 along an A-A direction. The electromagnetic switch 900 includes a driving apparatus 200 and a contact apparatus 100 disposed on the driving apparatus 200. The driving apparatus 200 uses an electromagnetic field generated by the coil to drive a movable iron core to move, to control opening and closing of the contact apparatus 100. The electromagnetic switch 900 in this implementation is a normally open contactor with a contact open in an initial state. The electromagnetic switch 900 in other implementations may be alternatively a normally closed contactor with a contact closed in an initial state.

It can be understood that the electromagnetic switch 900 shown in FIG. 2 and FIG. 3 generally further includes a housing. For example, the contact apparatus 100 and the driving apparatus 200 are accommodated in a hollow square housing. In contrast, a housing is omitted in a schematic diagram of the electromagnetic switch 900 in this embodiment.

The driving apparatus 200 includes a coil skeleton 21, a coil 22, a yoke 23, a static iron core 24, the movable iron core 25, a sealing sleeve 26, and a reset elastic member 27. The coil skeleton 21 may include a hollow cylindrical main-body portion 211, and the main-body portion 211 protrudes in a radial direction along two ends of an axial direction of the main-body portion 211 to form circular flange portions 212. The axial direction is a direction in which a cylinder rotates around a central axis, that is, a direction parallel to the central axis. The radial direction is perpendicular to the axial direction. The radial direction may be a radius or diameter direction of a circle of an end face of the cylinder.

The coil 22 is wound around the main-body portion 211 on the coil skeleton 21 and is located between the two flange portions 212 at the two ends of the main-body portion 211. It can be understood that two ends of the coil 22 are further connected to a coil terminal (not shown in the figure). For example, the coil terminal may be made of a conducting material such as copper, so that the coil terminal can energize the coil 22 to drive the driving apparatus 200.

The yoke 23 is made of a magnetic material and surrounds the coil skeleton 21. In this implementation, the yoke 23 is substantially in a "square" shape, and includes an upper cover 231, side plates 232, and a bottom plate 233 that are sequentially connected. The upper cover 231, the side plates 232, and the bottom plate 233 are all in rectangular plate-shaped structures, and the upper cover 231 and the bottom plate 233 are respectively corresponding to the two flange portions 212 of the coil skeleton 21. In an implementation, the bottom plate 233 and the side plates 232 may be integrally molded, that is, the bottom plate 233 and the pair of side plates 232 may be formed one by one by bending one plate.

An insertion via hole 233a is formed on the bottom plate 233 of the yoke 23, and the sealing sleeve 26 is mounted in the insertion via hole 233a. The insertion via hole 233a may be formed through stamping, so that a stamped part of the bottom plate 233 extends into the main-body portion 211 on the coil skeleton 21 to form a side wall of the insertion via hole 233a.

The static iron core 24 and the movable iron core 25 are disposed in the main-body portion 211 along the axial direction of the main-body portion 211 on the coil skeleton 21. The static iron core 24 is fixedly disposed at one end of the main-body portion 211 and is close to the upper cover 231. When the coil 22 is energized, the static iron core 24 is magnetized to produce suction force, and the movable iron core 25 can move in a direction close to the static iron core 24 under the action of the suction force. In this implementation, both the static iron core 24 and the movable iron core 25 are substantially cylindrical.

The sealing sleeve 26 is disposed in the coil skeleton 21 and surrounds the static iron core 24 and the movable iron core 25. In this implementation, the sealing sleeve 26 is made of a non-magnetically conductive material and has an open end 261. A circular supporting surface 212a is formed on the flange portions 212 that are of the coil skeleton 21 and that are close to the upper cover 231, and the open end 261 of the sealing sleeve 26 protrudes in a radial direction to form an abutting portion 261a. The supporting surface 212a is configured to carry and be fastened to the abutting portion 261a, to prevent the sealing sleeve 26 from falling off.

In this embodiment, outer diameters of the static iron core 24 and the movable iron core 25 are roughly the same as an inner diameter of the sealing sleeve 26. The static iron core 24 is disposed at the open end of the sealing sleeve 26, and the movable iron core 25 moves within the sealing sleeve 26. It can be understood that a moving range of the movable iron core 25 is from an end face that is of the static iron core 24 and that is away from the open end 261 to space that is of the sealing sleeve 26 and that is away from the upper cover 231.

In addition, an insertion hole 231a through which the static iron core 24 passes is provided at a substantially central location of the upper cover 231, and an inner diameter of the insertion hole 231a is less than the inner diameter of the sealing sleeve 26. A middle part of one end that is of the static iron core 24 and that is away from the movable iron core 25 protrudes in an axial direction of the static iron core 24 to form an insertion portion 243. The insertion portion 243 is mounted in the insertion hole 231a, to implement fastening and mounting of the static iron core 24. It can be understood that an insertion via hole 241 of the static iron core 24 penetrates through the insertion portion 243, and is used for insertion of the contact apparatus 100.

The reset elastic member 27 is sandwiched between the static iron core 24 and the movable iron core 25. The reset elastic member 27 is configured to apply driving force to the movable iron core 25 in a direction opposite to that of the suction force produced by the static iron core 24, to drive the movable iron core 25 to return to an initial location when the coil 22 is de-energized, that is, drive the movable iron core 25 to move to one end that is of the sealing sleeve 26 and that is away from the contact apparatus 100.

It should be noted that in this embodiment, an entire circumference of a middle part of the insertion via hole 241 of the static iron core 24 is provided with a first limiting portion 242 that protrudes towards a center side and that reduces an aperture of the insertion via hole 241. An entire circumference of a bottom of an insertion via hole 251 of the movable iron core 25 is provided with a second limiting portion 252 that protrudes towards the center side and that reduces an aperture of the insertion via hole 251. One end of the reset elastic member 27 abuts against the first limiting portion 242, and the other end of the reset elastic member 27 abuts against the second limiting portion 252.

The contact apparatus 100 includes a base body 10, two fixed contacts 30, and a moving contact component 50. The base body 10 is in a shape of a box with an opening on one side, and the opening side is disposed on the upper cover 231 of the driving apparatus 200. The base body 10 has an inner cavity 101. Two via holes 11 are disposed at intervals at a top that is of the base body 10 and that is away from the opening, and the two fixed contacts 30 are respectively fastened to the base body 10 through the corresponding via holes 11 and extend into the inner cavity 101. In this embodiment, the base body 10 is made of a heat resistant material (for example, ceramics). The fixed contacts 30 are substantially cylindrical and are made of a conducting material such as a copper material. The moving contact component 50 is located in the base body 10 and one end of the moving contact component 50 is mounted on the driving apparatus 200, so that the moving contact component 50 is capable of being in contact with or being separated from the two fixed contacts 30 under the driving of the driving apparatus 200.

The moving contact component 50 includes a pushing member 51, a moving contact 52, a connection member 53, and a contact elastic member 55. One end of the pushing member 51 is located in the base body 10 and the other end of the pushing member 51 is mounted on the movable iron core 25, so that the pushing member 51 can move within the base body 10 under the driving of the movable iron core 25.

The moving contact 52 is movably mounted on the pushing member 51 by using the connection member 53 and is configured to be in contact with or be separated from the fixed contacts 30 under the pushing action of the pushing member 51. The contact elastic member 55 is sandwiched between the moving contact 52 and the pushing member 51, and is configured to provide elastic force for the moving contact 52. The contact elastic member 55 ensures enough contact pressure when the moving contact 52 is in contact with the fixed contacts 30. In addition, the contact elastic member 55 alleviates impact force between the moving contact 52 and the fixed contacts 30 to some extent when the moving contact 52 and the fixed contacts 30 are in contact with each other, to reduce a possibility that the moving contact 52 and the fixed contacts 30 are damaged, thereby prolonging a service life of the electromagnetic switch 900. In this implementation, the contact elastic member 55 is a compression spring. It can be understood that the contact elastic member 55 may be alternatively an elastic structure such as a metal spring.

In this implementation, when the movable iron core 25 is at the initial location, the moving contact 52 is separated from the fixed contacts 30. In addition, when the movable iron core 25 is at a location at which the movable iron core 25 abuts against the static iron core 24, a location relationship between the movable iron core 25 and the moving contact 52 is set based on a contact status between the moving contact 52 and the fixed contacts 30. In a period when the coil 22 is not energized, the contact apparatus 100 may be disconnected, the two fixed contacts 30 may be disconnected, and the moving contact 52 may be separated from the fixed contacts 30. In a period when the coil 22 is energized, the moving contact 52 is in contact with the fixed contacts 30, the contact apparatus 100 is connected, and the two fixed contacts 30 are connected in this case.

Figure 4:
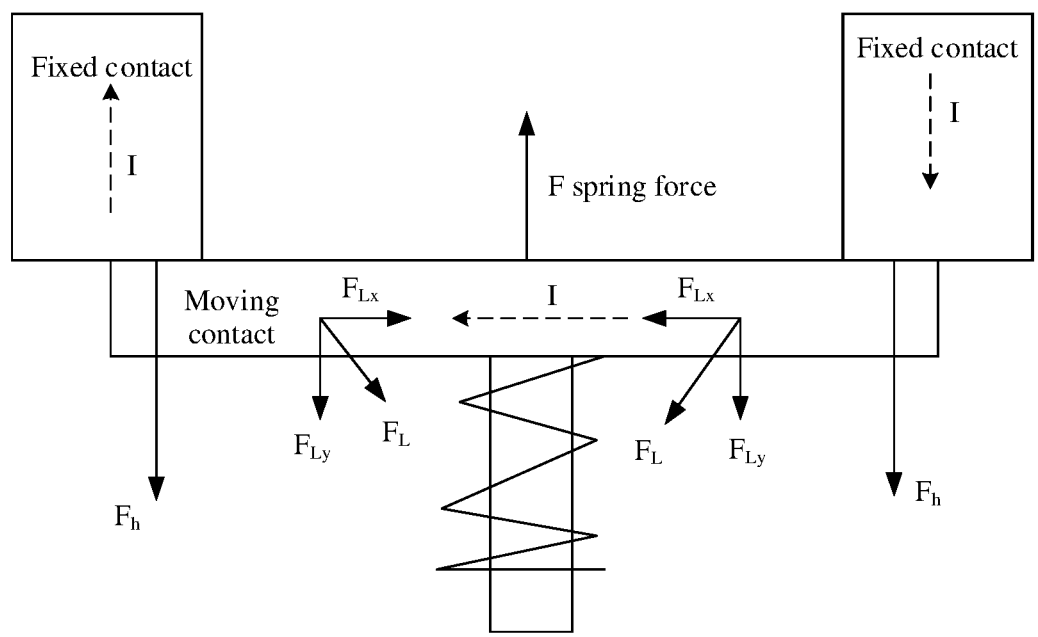
FIG. 4 is a schematic diagram of force applied when a moving contact is in contact with fixed contacts.

In this implementation, the contact apparatus 100 uses a bridge-type double-breakpoint contact structure. The two fixed contacts 30 are disposed at intervals in a first direction at one end that is of the base body 10 and that is away from the driving apparatus 200. In the bridge-type double-breakpoint contact structure, when the moving contact is in contact with the two fixed contacts, that is, when the moving contact and the fixed contacts are closed to conduct a current, the moving contact is subject to electric repulsion produced by the current. As shown in FIG. 4, the electric repulsion includes two parts: a Lorentz force $F_L$ produced by the current flowing through the fixed contacts against the current of the moving contact, and a Holm force $F_h$ produced through contraction when the current flows through a contact point between the moving contact and the fixed contacts. The Holm force $F_h$ is directly proportional to a square of the current I, that is, a higher current leads to larger Holm force $F_h$ produced, which is shown in a formula (1):

$$F_h = \mu_0/4\pi I^2 \ln R/r, \quad \text{formula (1)}$$

$F_h$ is Holm force applied to the moving contact of a single-contact-piece structure, $\mu_0$ is magnetic permeability in a vacuum, R is a radius of the moving contact, and r is a radius of a region in which the moving contact is in contact with the fixed contacts (namely, a contact radius). As the current I increases, for example, a short-circuit current, when the electric repulsion applied to the moving contact is greater than contact pressure, the moving contact has a risk of being electrically repulsed, and safety accidents such as explosion may be caused in serious cases.

Figure 5:
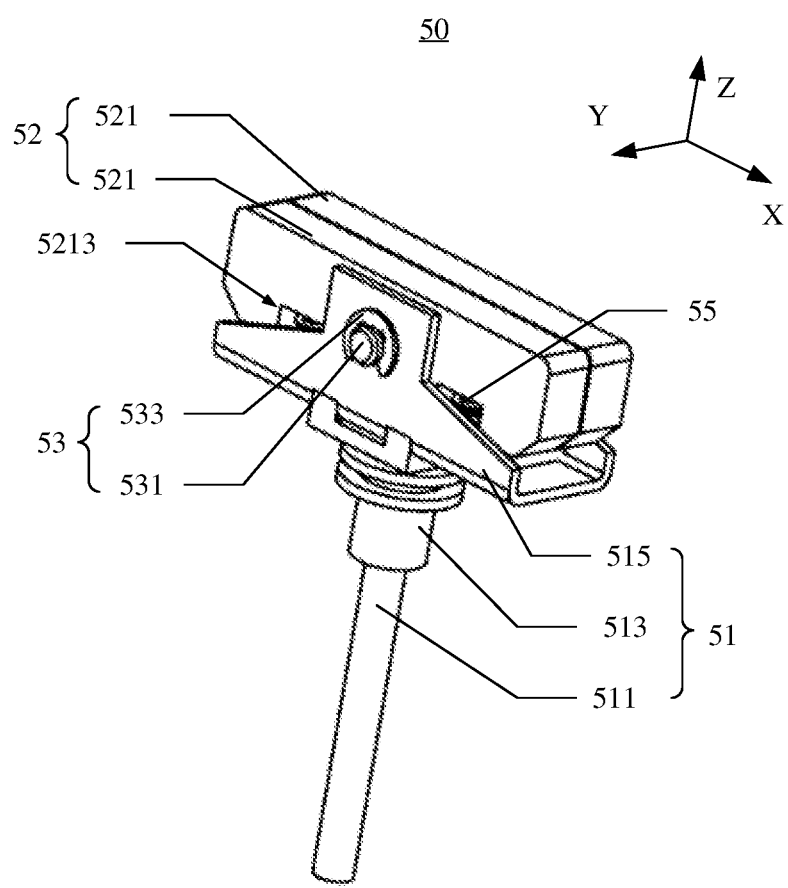
FIG. 5 is a schematic three-dimensional assembly diagram of a moving contact component in the electromagnetic switch shown in FIG. 3.
Figure 6:
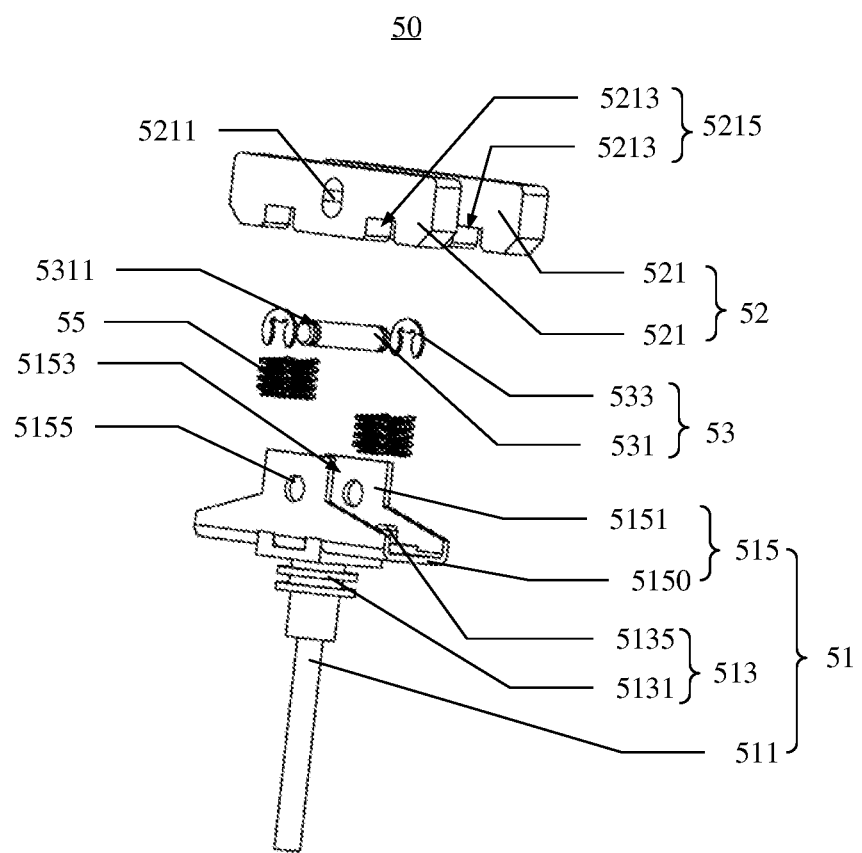
FIG. 6 is a schematic three-dimensional exploded diagram of the moving contact component shown in FIG. 5.

To resolve the foregoing problem and improve a capability of the electromagnetic switch 900 to resist a short-circuit current, in this embodiment, the moving contact 52 includes N parallel contact pieces 521, where N is an integer greater than 1. The N parallel contact pieces 521 are capable of being in contact with or being separated from the two fixed contacts 30 under the driving of the pushing member 51. FIG. 5 is a schematic three-dimensional assembly diagram of a moving contact component in the electromagnetic switch in FIG. 3. FIG. 6 is a schematic three-dimensional exploded diagram of the moving contact component in FIG. 5. In this implementation, a value of N is 2. The moving contact 52 includes the N parallel contact pieces 521, that is, the moving contact 52 includes N contact piece structures. Assuming that a total current flowing through the moving contact 52 is I, and a current flowing through each contact piece 521 is 1/N of the total current I of the moving contact 52. According to the formula (1), obtainable Holm force $F_h'$ applied to each contact piece 521 is $1/N^2 F_h$. This reduces the Holm force applied to the moving contact 52, reduces a possibility that the moving contact 52 is electrically repulsed when the moving contact 52 is subject to a high short-circuit current, and improves a short-circuit tolerance capability of the contact apparatus 100 and the electromagnetic switch 900.

In this implementation, the contact pieces 521 extend in the first direction (that is, a length direction of the contact pieces 521 is the first direction, namely, an X direction shown in FIG. 5). The N contact pieces 521 are arranged in a second direction (namely, a Y direction shown in FIG. 5) and are in contact with each other to implement a parallel connection between the N contact pieces 521. The pushing member 51 can drive the N parallel contact pieces 521 to move in a third direction (a Z direction shown in FIG. 5) under the driving of the driving apparatus 200. Any two of the first direction, the second direction, and the third direction are perpendicular to each other, so that the N parallel contact pieces 521 are in contact with or are separated from the two fixed contacts 30. It can be understood that the first direction is perpendicular to the second direction, the second direction is perpendicular to the third direction, or the third direction is perpendicular to the first direction. It can be understood that the N contact pieces 521 may be alternatively connected in parallel to each other through a wire connection or the like. This is not limited herein.

The N parallel contact pieces 521 are all provided with a first sliding hole 5211. The connection member 53 is slidably disposed through the first sliding hole 5211, so that the contact pieces 521 can move relative to the pushing member 51 in the third direction. The first sliding hole 5211 is an oblong hole extending in the third direction. Travel for which the moving contact 52 can move in the third direction is contact over-travel. An extension length of the first sliding hole 5211 in the third direction defines the contact over-travel of the moving contact 521. One end that is of the contact pieces 521 and that is close to the driving apparatus 200 is provided with limiting sub-grooves 5213, the limiting sub-grooves 5213 on the N parallel contact pieces 521 are connected to each other to form a limiting groove 5215, and the contact elastic member 55 abuts between the pushing member 51 and an inner wall of the limiting groove 5215. In this way, the same contact elastic member 55 can abut against all the contact pieces 521, and the same contact elastic member 55 provides the elastic force for all the contact pieces 521, to ensure the contact pressure between all the contact pieces 521 and the fixed contacts 30, reduce a quantity of contact elastic members 55 to be used, and simplify structures of the moving contact component 50 and the contact apparatus 100. This facilitates assembly and disassembly.

After the coil 22 is energized, when the moving contact 52 is in contact with the fixed contacts 30, the contact pieces 521 are pressed by the fixed contacts 30 and can move along the first sliding hole 5211 in a direction away from the fixed contacts 30, to prevent the contact pieces 521 and the fixed contacts 30 from being damaged through direct contact. The contact elastic member 55 can ensure the contact pressure between the contact pieces 521 and the fixed contacts 30. After the coil 22 is de-energized, the moving contact 52 is separated from the fixed contacts 30. The contact pieces 521 are returned to an initial location in the first sliding hole 5211 due to an elastic action of the contact elastic member 55.

In this implementation, there is one first sliding hole 5211, the first sliding hole 5211 is located substantially at a central location of the contact pieces 521, and there are two limiting sub-grooves 5213 on the contact pieces 521. The two limiting sub-grooves 5213 are disposed at intervals in the first direction, and the first sliding hole 5211 is located between the two limiting sub-grooves 5213. There are two contact elastic members 55, and the two contact elastic members 55 are in a one-to-one correspondence with the two limiting sub-grooves 5213, so that the elastic force applied to all parts of the N parallel contact pieces 521 are balanced.

It can be understood that quantities of limiting sub-grooves 5213 on the contact pieces 521, first sliding holes 5211, connection members 53, and contact elastic members 55 are not limited. For example, there is one limiting sub-groove 5213 on the contact pieces 521, there are two first sliding holes 5211 on the contact pieces 521, the limiting sub-groove 5213 is located between the two first sliding holes 5211, two connection members 53 are in a one-to-one correspondence with the two first sliding holes 5211, and one contact elastic member 55 abuts between the pushing member 51 and the inner wall of the limiting groove 5215. In addition, a manner of disposing the contact pieces 521 for the contact elastic member 55 is not limited, and the limiting sub-groove 5213 can be omitted. For example, a protruding pillar is provided on a side surface that is of the contact pieces 521 and that faces the driving apparatus 200. The contact elastic member 55 is sleeved on the protruding pillar.

The pushing member 51 includes a push rod 511, an isolation member 513, and a contact bracket 515. The push rod 511 is movably disposed through the insertion via hole 241 of the static iron core 24, and one end of the push rod 511 is fastened in the insertion via hole 251 of the movable iron core 25. The isolation member 513 is fixedly sleeved at one end that is of the push rod 511 and that is away from the movable iron core 25. The isolation member 513 is made of an electrical insulation material and is configured to keep desirable electrical insulation between the push rod 511 and the N parallel contact pieces 521. The contact bracket 515 is fixedly sleeved outside the isolation member 513 and is configured to carry the N parallel contact pieces 521. The N parallel contact pieces 521 are disposed through the contact bracket 515. The connection member 53 is fixedly connected to the contact bracket 515, and the contact elastic member 55 abuts between the isolation member 513 and the N parallel contact pieces 521.

When the moving contact 52 and the fixed contacts 30 are connected to each other after being in contact, the coil 22 has low-voltage electricity, and the moving contact 52 and the fixed contacts 30 form a contact high-voltage circuit. Because the desirable electrical insulation is kept between the push rod 511 and the N parallel contact pieces 521 by using the isolation member 513, and the contact high-voltage circuit is completely isolated from the low-voltage coil 22, when the electromagnetic switch 900 carries a high current or direct current high-voltage load, the low-voltage coil 22 of the electromagnetic switch 900 is not damaged because of impact of the high current and the high voltage, and a safety problem caused by a breakdown between a high voltage and a low voltage is prevented, that is, safety and reliability of the contact apparatus 100 and the electromagnetic switch 900 are improved.

The isolation member 513 includes a connecting portion 5131 and a guiding portion 5135. The connecting portion 5131 is fixedly sleeved at one end of the push rod 511 and is fixedly disposed through the contact bracket 515 and is configured to implement a fixed connection between the push rod 511 and the contact bracket 515. The guiding portion 5135 is disposed in a protruding manner on one side that is of the connecting portion 5131 and that faces away from the connecting portion 5131. The contact elastic member 55 is sleeved on the guiding portion 5135. The guiding portion 5135 is configured to guide movement of the contact elastic member 55, to improve contact stability between all the contact pieces 521 and the fixed contacts 30. It can be understood that a structure of the isolation member 513 is not limited. For example, the guiding portion 5135 can be omitted in the isolation member 513, provided that the isolation member 513 can electrically isolate the push rod 511 from the moving contact 52. In this implementation, the isolation member 513 is made of plastic. The push rod 511 and the contact bracket 515 are connected, through injection molding or in another manner, to the isolation member 513 made of plastic, to form the pushing member 51, and are isolated from each other by the plastic isolation member 513. It can be understood that the isolation member 513 is not limited to being made of plastic and may be alternatively made of another insulation material, and that the isolation member 513, the push rod 511, and the contact bracket 515 are fixedly connected to each other by using an injection molding process or the like.

The contact bracket 515 is substantially in a U-shaped frame. The contact bracket 515 includes a bottom wall portion 5150 and a side wall portion 5151 formed by bending and extending from two ends of the bottom wall portion 5150. An accommodation groove 5153 is enclosed by the bottom wall portion 5150 and the side wall portion 5150. The connecting portion 5131 of the isolation member 513 is disposed through the bottom wall portion 5150. The side wall portion 5151 is provided with a mounting hole 5155, and the connection member 53 is fixedly connected to the mounting hole 5155 on the accommodation groove. The N parallel contact pieces 521 are disposed through the accommodation groove 5153, and the contact elastic member 55 is accommodated in the accommodation groove 5153. A structure of the contact bracket 515 is simple, and assembly and disassembly of the contact pieces 521 and the contact bracket 515 are convenient. It can be understood that the structure of the contact bracket 515 is not limited. For example, the accommodation groove 5153 can be omitted in the contact bracket 515, provided that the contact bracket 515 can carry the N parallel contact pieces 521 of the moving contact 52.

The connection member 53 includes a contact shaft 531 and two clamping pieces 533. A clamping groove 5311 is provided at each end of the contact shaft 531. The contact shaft 531 is disposed through the mounting hole 5155 on the accommodation groove and the first sliding hole 5211. The clamping groove 5311 extends out of the mounting hole 5155 and is located outside the contact bracket 515. The clamping pieces 533 are clamped into clamping grooves 5311, to prevent the contact shaft 531 from being disengaged from the contact bracket 515, thereby fastening the contact shaft 531 to the contact bracket 515. The contact shaft 531 is fastened to the contact bracket 515 in a clamping manner. This facilitates assembly and disassembly of the moving contact component 50. It can be understood that there may be two or more connection members 53, a quantity of mounting holes 5155 on a side wall of the accommodation groove 5153 is corresponding to the quantity of connection members 53, and the quantity of first sliding holes 5211 is corresponding to the quantity of connection members 53. That the connection members 53 include the contact shaft 531 and two clamping pieces 533 is not limited, that is, that the connection members 53 are mounted on the contact bracket 515 in a clamping manner is not limited.

During assembly of the moving contact component 50, the isolation member 513 is sleeved at one end that is of the push rod 511 and that is away from the movable iron core 25, the contact bracket 515 is fixedly sleeved on the isolation member 513, the contact elastic member 55 is sleeved on the guiding portion 5135, the contact shaft 531 penetrates through the mounting hole 5155 of the contact bracket 515 and the first sliding hole 5211 of each contact piece 521, one end that is of the contact elastic member 55 and that faces away from the isolation member 513 is clamped into the limiting groove 5215, and the clamping pieces 533 are clamped into the clamping groove 5311. In this way, assembly of the moving contact component 50 can be completed. It can be understood that an assembly sequence of the moving contact component 50 is merely an example, and does not constitute any limitation.

When the electromagnetic switch 900 is in the initial state, the moving contact 52 is not in contact with the fixed contacts 30. When the coil 22 is energized, the static iron core 24 is magnetized to produce suction force, and the movable iron core 25 moves in a direction close to the static iron core 24 under the action of the suction force of the static iron core 24. The push rod 511 is driven by the movable iron core 25 to move towards the fixed contacts 30, and the N parallel contact pieces 521 of the moving contact 52 are in contact with the fixed contacts 30. In the moving contact component 50 and the electromagnetic switch 900, the moving contact 52 includes the N parallel contact pieces 521. Even if a high short-circuit current (for example, more than 15 kA) occurs between the moving contact 52 and the fixed contacts 30, because Holm force applied to a single contact piece 521 is small, the Holm force applied to the moving contact 52 is small. This reduces a possibility that the moving contact 52 is electrically repulsed, and is conducive to improving safety and reliability of the electromagnetic switch 900.

It should be noted that in this implementation, the sealing sleeve 26, the upper cover 231, and the base body 10 form a common sealing chamber.

It can be understood that the connection member 53 can be omitted and each contact piece 521 of the moving contact 52 may be directly connected to the pushing member 51. In an implementation, a contact apparatus is applied to an electromagnetic switch, and includes a base body, two fixed contacts, and a moving contact component. The base body has an inner cavity. The two fixed contacts are fastened to one end of the base body at intervals and extend into the inner cavity of the base body. The moving contact component includes a pushing member and a moving contact. The pushing member is movably disposed through the base body. The moving contact is mounted on the pushing member and is located in the inner cavity of the base body. The moving contact includes N parallel contact pieces, where N is an integer greater than 1. The N parallel contact pieces are capable of being in contact with or being separated from the two fixed contacts under the driving of the pushing member.

Figure 7:
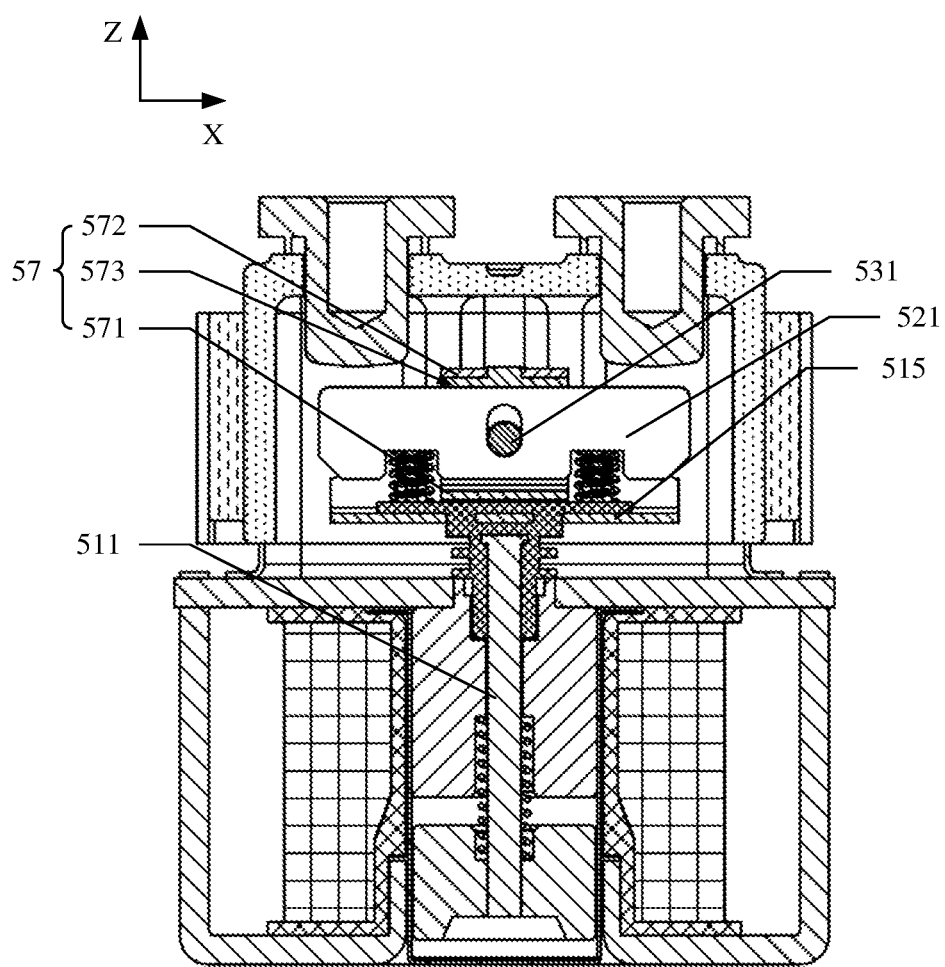
FIG. 7 is a cross-sectional view of an electromagnetic switch according to a second implementation.

FIG. 7 is a cross-sectional view of an electromagnetic switch according to a second implementation. This implementation differs from the electromagnetic switch provided in the first implementation in that, the moving contact component further includes a compensation structure 57, configured to produce electromagnetic force offsetting a part of electric repulsion applied to the moving contact 52, thereby further improving a capability of the electromagnetic switch to resist a short-circuit current.

Figure 8:
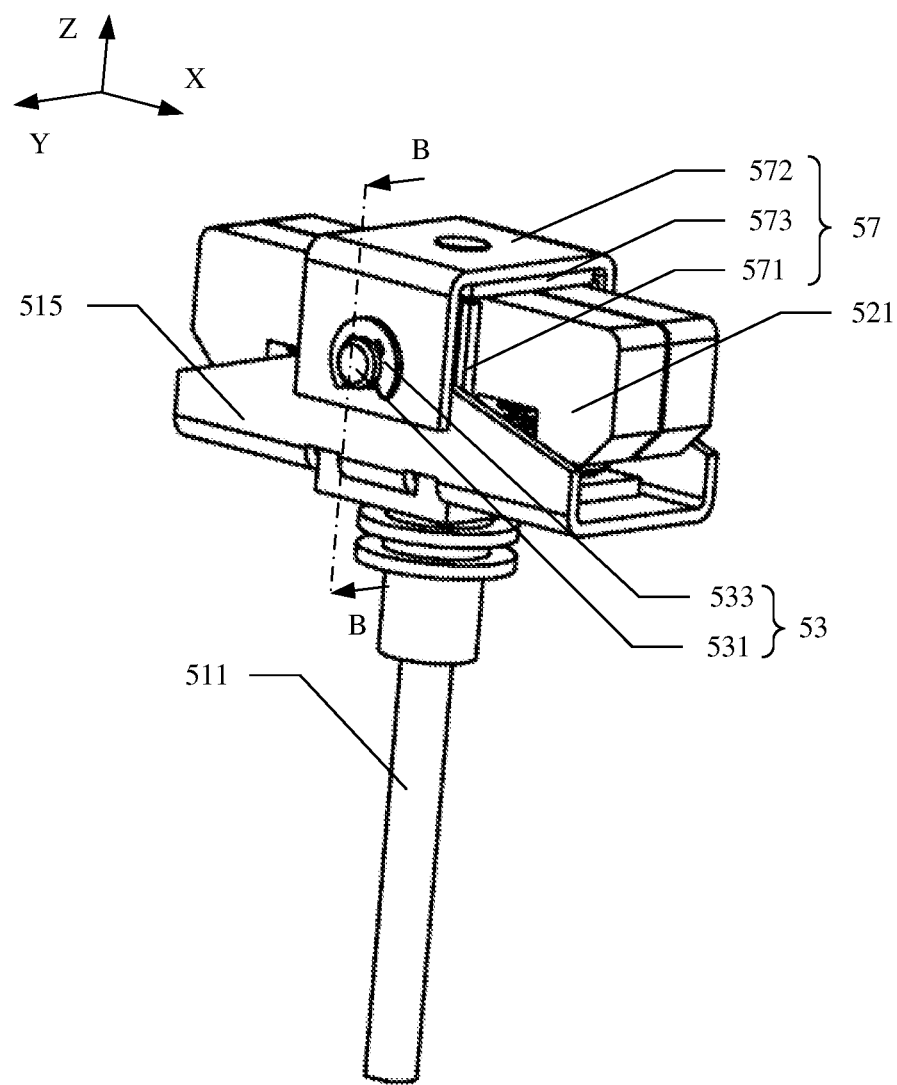
FIG. 8 is a schematic three-dimensional assembly diagram of the moving contact component shown in FIG. 7.
Figure 9:
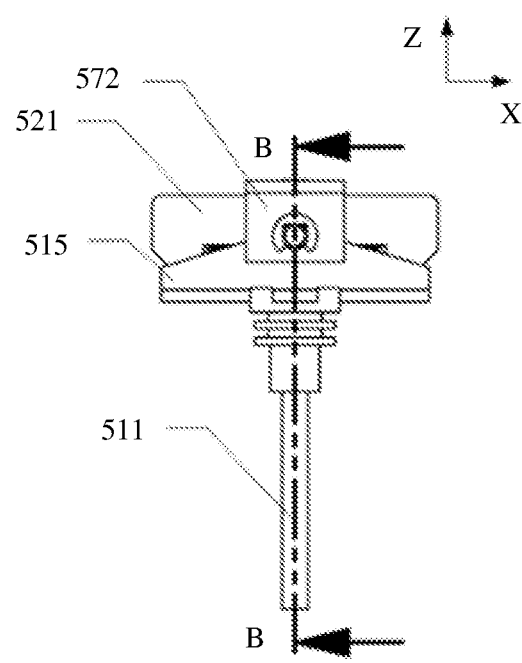
FIG. 9 is a side view of the moving contact component shown in FIG. 7.

As shown in FIG. 8 and FIG. 9, the compensation structure 57 includes a movable magnetizer 571, a mounting bracket 572, and a static magnetizer 573. The movable magnetizer 571 is slidably sleeved on the contact shaft 531 of the connection member 53 and is accommodated in the contact bracket 515. The mounting bracket 572 is fastened to the contact bracket 515 and is located on one side that is of the contact pieces 521 and that faces away from the push rod 511. The mounting bracket 572 is made of a non-magnetically conductive material. The static magnetizer 573 is fastened to the mounting bracket 572 and is located between the N parallel contact pieces 521 and the mounting bracket 572. An operating air gap 501 is formed between the static magnetizer 573 and the movable magnetizer 571. The contact elastic member 55 is disposed through the movable magnetizer 571 and abuts between the contact pieces 521 and the isolation member 513.

Figure 10:
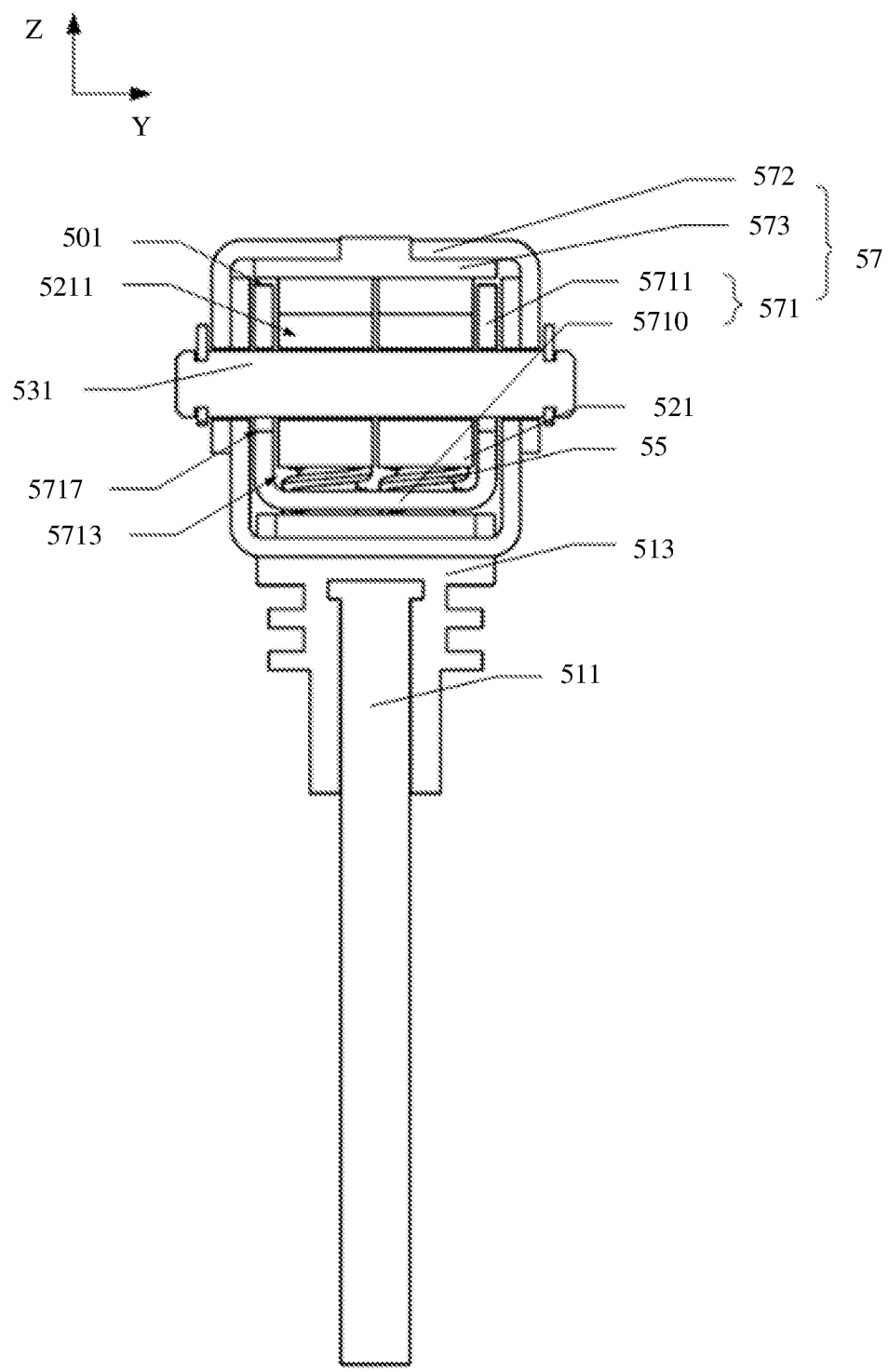
FIG. 10 is a cross-sectional view of the moving contact component shown in FIG. 8 in a state along a B-B line.

FIG. 10 is a state diagram in which the contact pieces 521 of the moving contact 52 are not in contact with the fixed contacts (which are omitted in FIG. 10). The contact pieces 521 and the movable magnetizer 571 are at initial locations.

Figure 11:
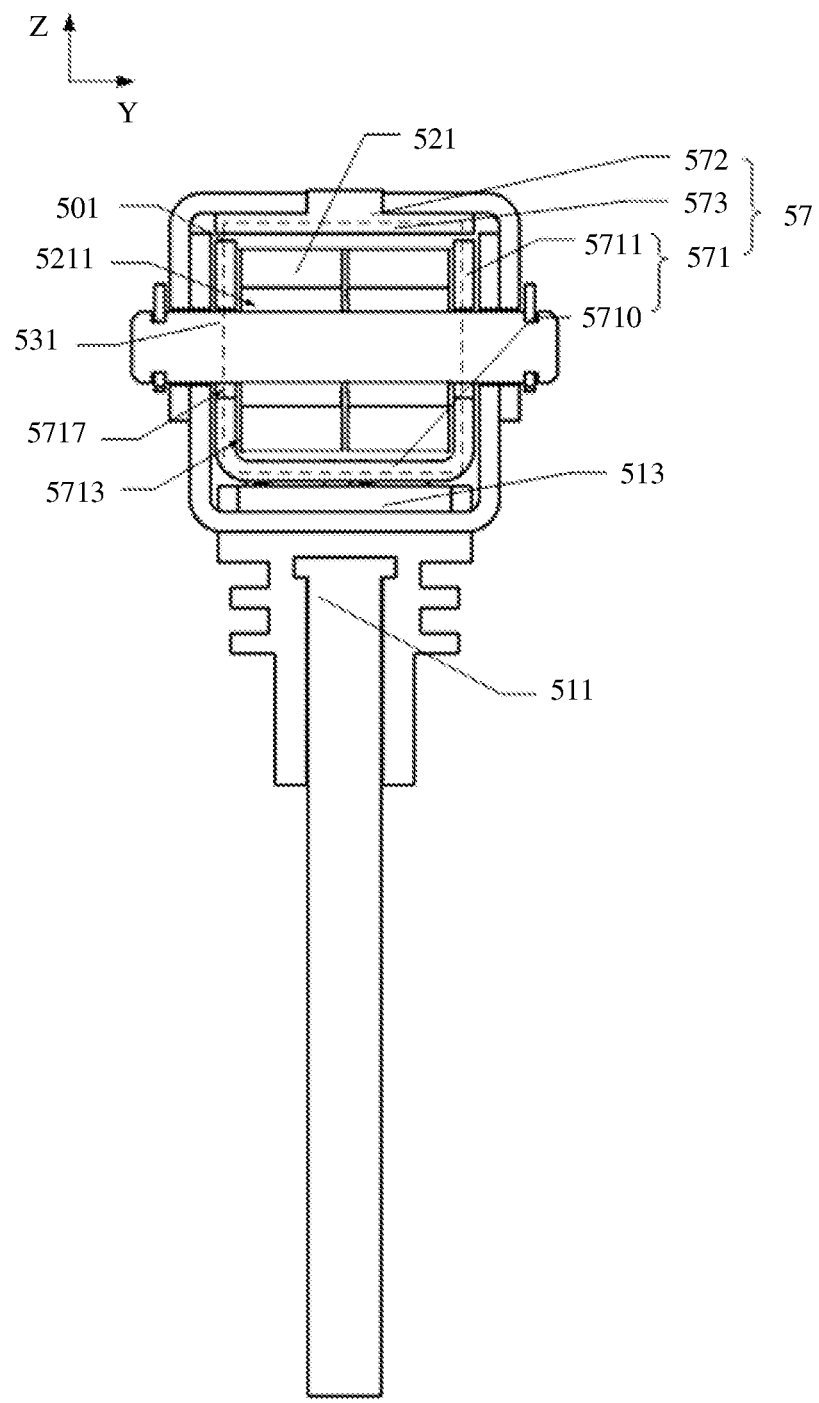
FIG. 11 is a cross-sectional view of the moving contact component shown in FIG. 8 in another state along a B-B line.

FIG. 11 is a state diagram in which the contact pieces 521 of the moving contact 52 are in contact with the fixed contacts (which are omitted in FIG. 11). When being in contact with the fixed contacts, the contact pieces 521 of the moving contact 52 move, under pressure of the fixed contacts, towards a direction in which the push rod 511 is located. When a short-circuit current flows through the moving contact 52 and the two fixed contacts 30 when the moving contact 52 and the two fixed contacts 30 are in contact with each other, the electromagnetic force that makes the static magnetizer 573 and the movable magnetizer 571 attract each other based on the current is produced, so that the static magnetizer 573 and the movable magnetizer 571 attract each other, and the part of the electric repulsion applied to the moving contact 52 is offset. When the short-circuit current is generated, the short-circuit current may produce electromagnetic suction force F in an electromagnetic circuit formed by the static magnetizer and the movable magnetizer (for example, a dashed-line box shown in FIG. 11). Magnitude of the electromagnetic suction force F is directly proportional to a square of the current and an air gap area S of the operating air gap, and is inversely proportional to a square of an air gap distance δ of the operating air gap. A formula (2) may be:

$$F \propto I^2 * S/\delta^2, \qquad \text{formula (2)}$$

As shown in the formula (2), the suction force between the magnetizers can be increased by increasing the air gap area of the operating air gap or decreasing the air gap distance of the operating air gap. When the movable magnetizer 571 moves towards the static magnetizer 573, the air gap distance of the operating air gap 501 becomes smaller, and then the electromagnetic suction force F becomes larger. This offsets a part of the Holm force applied to the moving contact 52. A moving contact structure including the N parallel contact pieces 521 together with the compensation structure 57 greatly improves the short-circuit tolerance capability of the contact apparatus 100 and the electromagnetic switch 900.

The movable magnetizer 571 may be substantially in a U-shaped structure. The movable magnetizer 571 includes a bottom wall portion 5710 and a side wall portion 5711 formed by bending and extending from two ends of the bottom wall portion 5710. An opening groove 5713 is enclosed jointly by the bottom wall portion 5710 and the side wall portion 5711. The N parallel contact pieces 521 are disposed through the opening groove 5713, that is, the movable magnetizer 571 wraps the N parallel contact pieces 521, and this facilitates assembly of the movable magnetizer 571 and the N parallel contact pieces 521. A second sliding hole 5717 is provided on a side wall of the opening groove of the side wall portion 5711, and the contact shaft 531 is slidably disposed through the second sliding hole 5717.

Travel for which the contact pieces 521 can move in the third direction is contact over-travel. Because the movable magnetizer 571 is capable of moving relative to the moving contact 52, the air gap distance that can be reduced for the operating air gap 501 is greater than the contact over-travel. This is conducive to further reducing the air gap distance of the operating air gap 501, thereby further improving the capability of the contact apparatus to resist a short-circuit current. The movable magnetizer 571 wraps the contact pieces 521 and is mounted together with the contact pieces 521 by using the contact shaft 531. The movable magnetizer 571 can move up and down when subject to the electromagnetic force, to adjust the operating air gap 501 between the movable magnetizer 571 and the static magnetizer 573. The compensation structure 57 is added to the contact apparatus. The electromagnetic suction force produced by the movable magnetizer 571 offsets the part of the electric repulsion applied to the moving contact, and the operating air gap of the compensation structure 57 can be automatically adjusted. Because the air gap distance that can be reduced for the operating air gap is greater than the contact over-travel, compensation force is greater than that provided by the existing contact apparatus.

It can be understood that the movable magnetizer 571 is not limited to being slidably sleeved on the connection member 53, and the movable magnetizer 571 may be fastened to the contact pieces 521, that is, the movable magnetizer 571 and the contact pieces 521 form a movable member that moves relative to the contact bracket 515, so that the air gap distance that can be reduced for the operating air gap is equal to the contact over-travel.

It can be understood that the mounting bracket 572 can be omitted, and the static magnetizer 573 may be directly fastened to the contact bracket 515. In an implementation, the compensation structure includes a movable magnetizer and a static magnetizer. The movable magnetizer is slidably sleeved on the contact bracket, and the static magnetizer is fastened to the contact bracket and is located on one side that is of the contact pieces and that faces away from the push rod. An operating air gap is formed between the static magnetizer and the movable magnetizer. Electromagnetic suction force is capable of being produced between the movable magnetizer and the static magnetizer based on the current flowing through the moving contact and the fixed contacts when the moving contact and the fixed contacts are in contact with each other, so that the movable magnetizer moves towards the static magnetizer.

Figure 12:
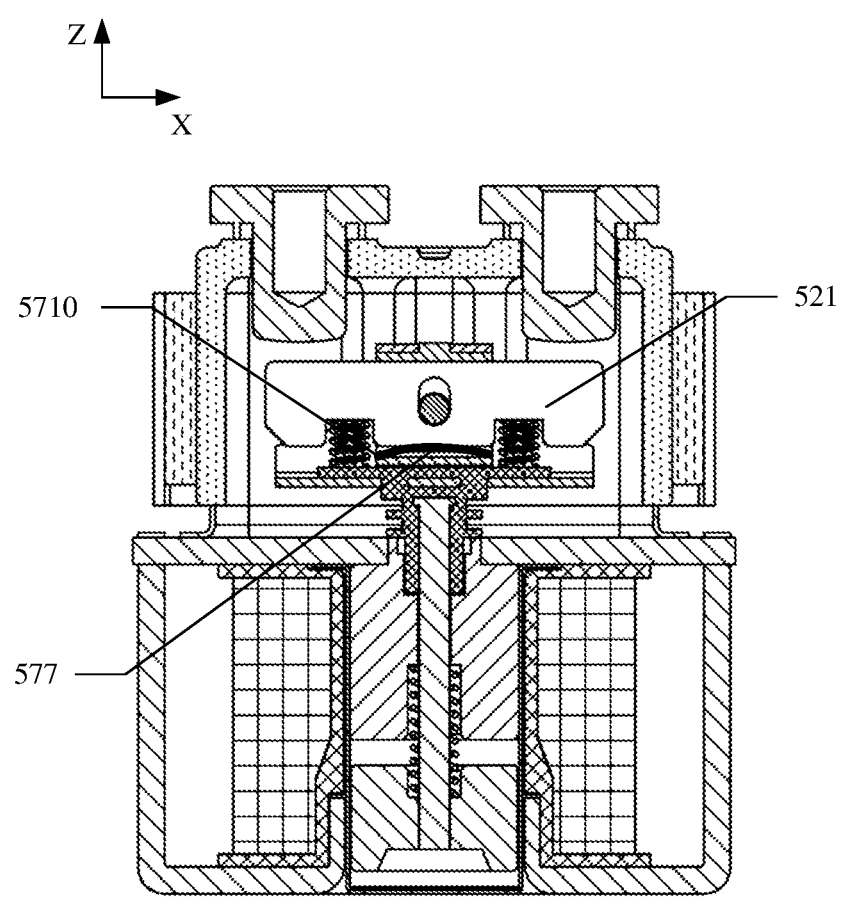
FIG. 12 is a cross-sectional view of a moving contact component according to an implementation.

In an implementation, as shown in FIG. 12, the compensation structure further includes an elastic piece 577, the elastic piece 577 abuts between the bottom wall portion 5710 of the movable magnetizer 571 and the contact pieces 521, and is configured to reset the movable magnetizer 571.

The foregoing descriptions are implementations of the embodiments. It should be noted that a person of ordinary skill in the art can make several improvements and polishing without departing from the embodiments and the improvements and polishing shall fall within the scope of the embodiments.

The invention claimed is:

1. A contact apparatus that is used in an electromagnetic switch, comprising:
   a base body, wherein the base body has an inner cavity;
   two fixed contacts, wherein the two fixed contacts are fastened to one end of the base body at intervals and extend into the inner cavity of the base body; and
   a moving contact component that comprises a pushing member and a moving contact, wherein the pushing member is movably disposed through the base body, the moving contact is mounted on the pushing member and is located in the inner cavity of the base body, the moving contact comprises N parallel contact pieces, N is an integer greater than 1; and the N parallel contact pieces are configured to be in contact with or separate from the two fixed contacts as driven by the pushing member, wherein the moving contact component further comprises:
   a connection member; and
   a contact elastic member; the N parallel contact pieces are all provided with a first sliding hole; the connection member is slidably disposed through the first sliding hole and is fixedly connected to the pushing member; the contact elastic member is located between the N parallel contact pieces and the pushing member; and the N parallel contact pieces are capable of moving towards or away from the fixed contacts relative to the pushing member.

2. The contact apparatus according to claim 1, wherein the pushing member further comprises:
   a push rod,
   an isolation member, and
   a contact bracket; the isolation member is fixedly sleeved at one end of the push rod; the contact bracket is fixedly sleeved outside the isolation member; the N parallel contact pieces are disposed through the contact bracket;

the connection member is fixedly connected to the contact bracket; the elastic member abuts between the isolation member and the N parallel contact pieces; and the isolation member is configured to keep electrical insulation between the push rod and the N parallel contact pieces.

3. The contact apparatus according to claim 2, wherein the moving contact component further comprises:
a compensation structure comprising a movable magnetizer and a static magnetizer; the movable magnetizer is configured to be movably connected to the contact bracket, the static magnetizer is configured to be fastened to the contact bracket and is located on one side that is of the contact pieces and that faces away from the push rod, an operating air gap is formed between the static magnetizer and the movable magnetizer, and electromagnetic suction force is configured to be produced between the movable magnetizer and the static magnetizer based on a current flowing through the moving contact and the fixed contacts when the moving contact and the fixed contacts are in contact with each other, so that the movable magnetizer moves towards the static magnetizer.

4. The contact apparatus according to claim 3, wherein the movable magnetizer is accommodated in the contact bracket; the contact bracket comprises:
a bottom wall portion of the movable magnetizer and
a side wall portion formed by bending and extending from two ends of the bottom wall portion; an opening groove is enclosed jointly by the bottom wall portion and the side wall portion; the N parallel contact pieces are disposed through the opening groove; the bottom wall portion is located between the contact pieces and the isolation member; the side wall portion is provided with a second sliding hole, the contact elastic member is disposed through the bottom wall portion, the connection member is configured to be slidably disposed through the second sliding hole, and the movable magnetizer is configured to move relative to the contact pieces.

5. The contact apparatus according to claim 4, wherein the compensation structure further comprises:
an elastic piece that abuts between the bottom wall portion of the movable magnetizer and the N contact pieces.

6. The contact apparatus according to claim 3, wherein the compensation structure further comprises:
a mounting bracket configured to be fastened to the contact bracket the static magnetizer is configured to be fastened to the mounting bracket, and the static magnetizer is located between the mounting bracket and the N parallel contact pieces.

7. The contact apparatus according to claim 2, wherein the contact pieces are provided with limiting sub-grooves, the limiting sub-grooves on the N parallel contact pieces are connected to each other to form a limiting groove, and the contact elastic member abuts between the isolation member and an inner wall of the limiting groove.

8. The contact apparatus according to claim 3, wherein the contact pieces are provided with limiting sub-grooves, the limiting sub-grooves on the N parallel contact pieces are connected to each other to form a limiting groove, and the contact elastic member abuts between the isolation member and an inner wall of the limiting groove.

9. The contact apparatus according to claim 4, wherein the contact pieces are provided with limiting sub-grooves, the limiting sub-grooves on the N parallel contact pieces are connected to each other to form a limiting groove, and the contact elastic member abuts between the isolation member and an inner wall of the limiting groove.

10. The contact apparatus according to claim 2, wherein a guiding portion is disposed in a protruding manner on one side that is of the isolation member and that faces away from the push rod, and the elastic member is sleeved on the guiding portion.

11. The contact apparatus according to claim 3, wherein a guiding portion is disposed in a protruding manner on one side that is of the isolation member and that faces away from the push rod, and the elastic member is sleeved on the guiding portion.

12. An electromagnetic switch, comprising:
a driving apparatus and
a contact apparatus, wherein the contact apparatus comprises a base body, two fixed contacts, and a moving contact component, wherein the base body has an inner cavity; the two fixed contacts are fastened to one end of the base body at intervals and extend into the inner cavity of the base body; the moving contact component comprises a pushing member and a moving contact; the pushing member is configured to be movably disposed through the base body, the moving contact is configured to be mounted on the pushing member and is located in the inner cavity of the base body, the moving contact comprises N parallel contact pieces, wherein N is an integer greater than 1, and the N parallel contact pieces are configured to be in contact with or being separated from the two fixed contacts under driving of the pushing member, wherein the moving contact component further comprises:
a connection member; and
a contact elastic member; the N parallel contact pieces are all provided with a first sliding hole; the connection member is configured to be slidably disposed through the first sliding hole and is fixedly connected to the pushing member, the contact elastic member is located between the N parallel contact pieces and the pushing member; and the N parallel contact pieces are configured to move toward or away from the fixed contacts relative to the pushing member; wherein
one end that is of the base body and that is away from the fixed contacts is fixedly connected to the driving apparatus, the driving apparatus is connected to one end that is of the pushing member of the contact apparatus and that is away from the moving contact, and is configured to drive the pushing member to move.

13. The electromagnetic switch according to claim 12, wherein the pushing member further comprises:
a push rod,
an isolation member, and
a contact bracket; the isolation member is fixedly sleeved at one end of the push rod; the contact bracket is fixedly sleeved outside the isolation member; the N parallel contact pieces are disposed through the contact bracket; the connection member is fixedly connected to the contact bracket; the elastic member abuts between the isolation member and the N parallel contact pieces; and the isolation member is configured to keep electrical insulation between the push rod and the N parallel contact pieces.

14. The electromagnetic switch according to claim 13, wherein the moving contact component further comprises:
a compensation structure that comprises a movable magnetizer and a static magnetizer, the movable magnetizer is configured to be movably connected to the contact bracket, the static magnetizer is configured to be fastened to the contact bracket and is located on one side that is of the contact pieces and that faces away from the push rod, an operating air gap is formed between the static magnetizer and the movable magnetizer, and an electromagnetic suction force is configured to be produced between the movable magnetizer and the static magnetizer based on a current flowing through the moving contact and the fixed contacts when the moving contact and the fixed contacts are in contact with each other, so that the movable magnetizer is configured to move towards the static magnetizer.

15. The electromagnetic switch according to claim 14, wherein the movable magnetizer is accommodated in the contact bracket; the contact bracket comprises a bottom wall portion of the movable magnetizer and a side wall portion formed by bending and extending from two ends of the bottom wall portion; an opening groove is enclosed jointly by the bottom wall portion and the side wall portion; the N parallel contact pieces are disposed through the opening groove; the bottom wall portion is located between the contact pieces and the isolation member; the side wall portion is provided with a second sliding hole; the contact elastic member is disposed through the bottom wall portion; the connection member is slidably disposed through the second sliding hole; and the movable magnetizer is configured to move relative to the contact pieces.

16. An onboard charger comprising an electromagnetic switch, wherein the electromagnetic switch comprises:
a driving apparatus; and
a contact apparatus, wherein the contact apparatus comprises a base body, two fixed contacts, and a moving contact component, wherein the base body has an inner cavity; the two fixed contacts are fastened to one end of the base body at intervals and extend into the inner cavity of the base body, the moving contact component comprises a pushing member and a moving contact, the pushing member is configured to be movably disposed through the base body, the moving contact is configured to be mounted on the pushing member and is located in the inner cavity of the base body; the moving contact comprises N parallel contact pieces, wherein N is an integer greater than 1; and the N parallel contact pieces are configured to be in contact with or being separated from the two fixed contacts under driving of the pushing member, wherein the moving contact component further comprises:
a connection member and
a contact elastic member; the N parallel contact pieces are all provided with a first sliding hole; the connection member is slidably disposed through the first sliding hole and is fixedly connected to the pushing member; the contact elastic member is located between the N parallel contact pieces and the pushing member; and the N parallel contact pieces are configured to move toward or away from the fixed contacts relative to the pushing member; wherein
one end that is of the base body and that is away from the fixed contacts is fixedly connected to the driving apparatus, the driving apparatus is connected to one end that is of the pushing member of the contact apparatus and that is away from the moving contact, and is configured to drive the pushing member to move.

17. The onboard charger according to claim 16, wherein the pushing member further comprises:
a push rod,
an isolation member, and
a contact bracket; the isolation member is fixedly sleeved at one end of the push rod; the contact bracket is fixedly sleeved outside the isolation member; the N parallel contact pieces are disposed through the contact bracket; the connection member is fixedly connected to the contact bracket; the elastic member abuts between the isolation member and the N parallel contact pieces; and the isolation member is configured to keep electrical insulation between the push rod and the N parallel contact pieces.

* * * * *